United States Patent
Lee

(10) Patent No.: US 6,272,961 B1
(45) Date of Patent: Aug. 14, 2001

(54) CUTTING MACHINE WITH BUILT-IN MITER CUTTING FEATURE

(76) Inventor: Wy Peron Lee, 11614 Sterling Ave., Suite 103, Riverside, CA (US) 92503

( * ) Notice: Subject to any disclaimer, the term of this patent is extended or adjusted under 35 U.S.C. 154(b) by 0 days.

(21) Appl. No.: 09/498,693

(22) Filed: Feb. 7, 2000

(51) Int. Cl.[7] .............................. B26D 5/00; B27B 5/25; B28D 1/04
(52) U.S. Cl. ............................. 83/581; 83/168; 83/169; 83/171; 83/435.11; 83/473; 83/477.1; 83/477.2; 83/699.51; 125/13.03
(58) Field of Search ................... 125/35, 13.03, 125/16.04, 16.03; 83/168, 169, 171, 473, 474, 581, 475, 477.1, 477.2, 935.11, 699.51; 451/450, 488

(56) References Cited

U.S. PATENT DOCUMENTS

| | | | |
|---|---|---|---|
| 3,672,251 | * 6/1972 | Jagers | 83/169 |
| 3,807,095 | * 4/1974 | Harding et al. | 125/35 X |
| 4,002,094 | * 1/1977 | Erickson et al. | 83/471.3 |
| 4,428,159 | * 1/1984 | Sigetich et al. | 125/13.03 |
| 4,991,354 | * 2/1991 | Schweickhardt | 125/35 X |
| 5,676,124 | * 10/1997 | Lee | 125/13.01 |
| 5,746,193 | * 5/1998 | Swan | 125/13.03 |
| 5,947,103 | * 9/1999 | Saccon | 125/13.03 X |

* cited by examiner

Primary Examiner—Boyer Ashley
(74) Attorney, Agent, or Firm—Raymond Y. Chan; David and Raymond Patent Group

(57) ABSTRACT

A cutting machine with built-in miter cutting feature includes a miter cutting arrangement connected between a table frame and a cutting head such that the cutting head is capable of rotating in a vertical manner along a supporting arm upwardly extended from the table frame. Also, the cutting machine can be adjusted to accommodate cutting work in at an angle with respect to a cutting table by rotating the miter cutting arrangement by means of a pivot shaft connected therein.

30 Claims, 7 Drawing Sheets

CUTTING MACHINE WITH BUILT-IN MITER CUTTING FEATURE

BACKGROUND OF THE PRESENT INVENTION

1. Field of Invention

The present invention relates to cutting machine, and more particularly to a cutting machine with built-in miter cutting feature which is adjusted accommodate cutting work in at an angle or a bevel for precision cutting on materials such as ceramic tile, marble, and the like.

2. Description of Related Arts

Referring to FIG. 1 of the drawing, a conventional cutting machine as illustrated is commonly used in the construction industry for shaping and cutting materials such as ceramic tile, marble, cranite, and natural stone. The conventional cutting machine comprises a cutting table 11 supported on a table frame 12, with legs 171 and a cutting head 13 overhanging the cutting table 11 with a circular saw blade 14 which is powered by an electric motor 15. The electric motor 15 is directly mounted on the cutting head 13 for driving the saw blade 14 to rotate through a transmission means 16.

Conventionally, the saw blade 14 is rigidly installed perpendicularly to the cutting table 11 so that when a work piece is placed horizontally to the cutting table 11 for cutting or shaping, the work piece will be cut and has a right angled cutting edge. If a user wants to have a bevel cut on the work piece, the user must inclinedly support the work piece to adjust a slanted angle with respect to the saw blade 14 by himself.

Some cutting machines provide a 30° to 45° miter block to inclinedly support the work piece so that the vertical saw blade can be positioned to the work piece at a slanted angle in order to provide a bevel cut on the work piece. However, the angle of the work piece to be lifted up is limited by the size of miter block. Sometime, when the miter block fails to correctly place in position, an uneven bevel cut may happen or a permanent damage may be caused to the work piece. In general, the work piece to be cut for installation needs to be placed up side down for proper angle cutting, that may cause chipping at the work piece's cutting edge.

SUMMARY OF THE PRESENT INVENTION

A main object of the present invention is to provide a cutting machine with built-in miter cutting feature that accommodates cutting work in at an angle or a bevel for precision cutting on a work piece.

Another object of the present invention is to provide a cutting machine with built-in miter cutting feature wherein the cutting head can be adjustably rotated up to 45° with respect to the horizontal work piece surface for providing a bevel cut on the work piece.

Another object of the present invention is to provide a cutting machine with built-in miter cutting feature, wherein the miter cutting arrangement comprises a locker device for locking the cutting head at either a normal position or a slanted position.

Another object of the present invention is to provide a cutting machine with built-in miter cutting feature, wherein the inclination of the cutting head, i.e. the inclination of the cutting blade, can be adjusted by operating the miter cutting arrangement.

Another object of the present invention is to provide a cutting machine with built-in miter cutting feature, wherein the miter cutting arrangement, wherein the platform level of the cutting head can also be adjusted.

Accordingly, in order to accomplish the above objects, the present invention provides a cutting machine with built-in miter cutting feature, which comprises:

a table frame;

a cutting table slidably mounted on the table frame;

a coolant tray which is supported in the table frame and is disposed beneath the cutting table; and a cutting head comprising a motor, a saw blade, and a transmission means for transmitting a rotating power of the motor to drive the saw blade to rotate;

a cutting head support bracket affixed at one side of the table frame for supporting the cutting head above the cutting table;

a miter cutting arrangement, which is provided between the cutting head support bracket and the cutting head, comprising:

a platform support frame which comprises a platform support arm, a mounting mean for longitudinally mounting the platform support arm to the cutting head support bracket so as to support the platform support arm longitudinally extending above of the table frame, and a platform pivot arm having an inner end affixed to the platform support arm and an outer end laterally extended from the platform support arm;

a head platform wherein the motor is firmly mounted thereon and the saw blade is rotatably supported at an outer side thereof;

a pivot means for pivotally connecting the outer side of the head platform with the platform pivot arm in a perpendicular manner that the cutting head is able to be rotated about the outer side of the head platform to a slanted position by lifting an inner side of the head platform up from the platform support frame;

a supporting means for supporting the inner side of the head platform with the platform support arm, so that, during a normal position, the outer side and the inner side of the head platform are respectively supported by the platform pivot arm and the platform support arm; and a locker device for selectively locking the cutting head at the normal position and the slanted position.

DETAILED DESCRIPTION OF THE PREFERRED EMBODIMENT

Figure 1:
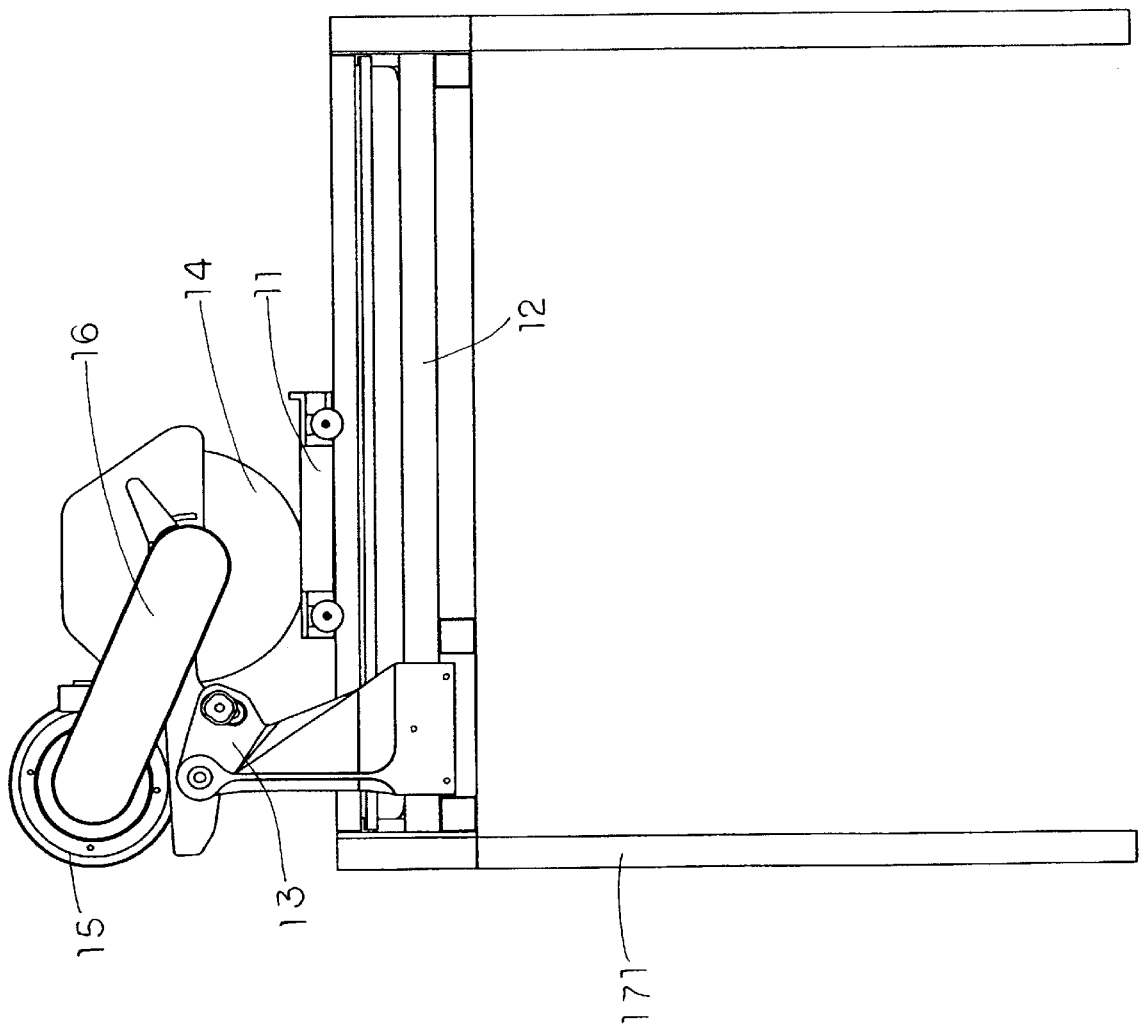
FIG. 1 is a side view of a conventional cutting machine.

Referring to FIGS. 2 to 7 of the drawings, a cutting machine with built-in miter cutting feature, which is specifically designed for ceramic and masonry work pieces such as tiles, according to a preferred embodiment of the present invention is illustrated. The cutting machine comprises a table frame 20, a cutting table 30 slidably mounted on the table frame 20, a cutting head 40 supported above the cutting table 30, a coolant tray 50 supported in the table frame 20 and disposed beneath the cutting table 30, and a miter cutting arrangement 60 arranged to support the cutting head 30 for providing a cutting work at a slanted angle.

A cutting head support bracket 23 is affixed at one side of the table frame 20 for supporting the cutting head 40 above the cutting table 30.

The cutting head 40 comprises a motor 41, a saw blade 42, and a transmission means 43 for transmitting a rotating power of the motor 41 to drive the saw blade 42 to rotate.

Figure 3:
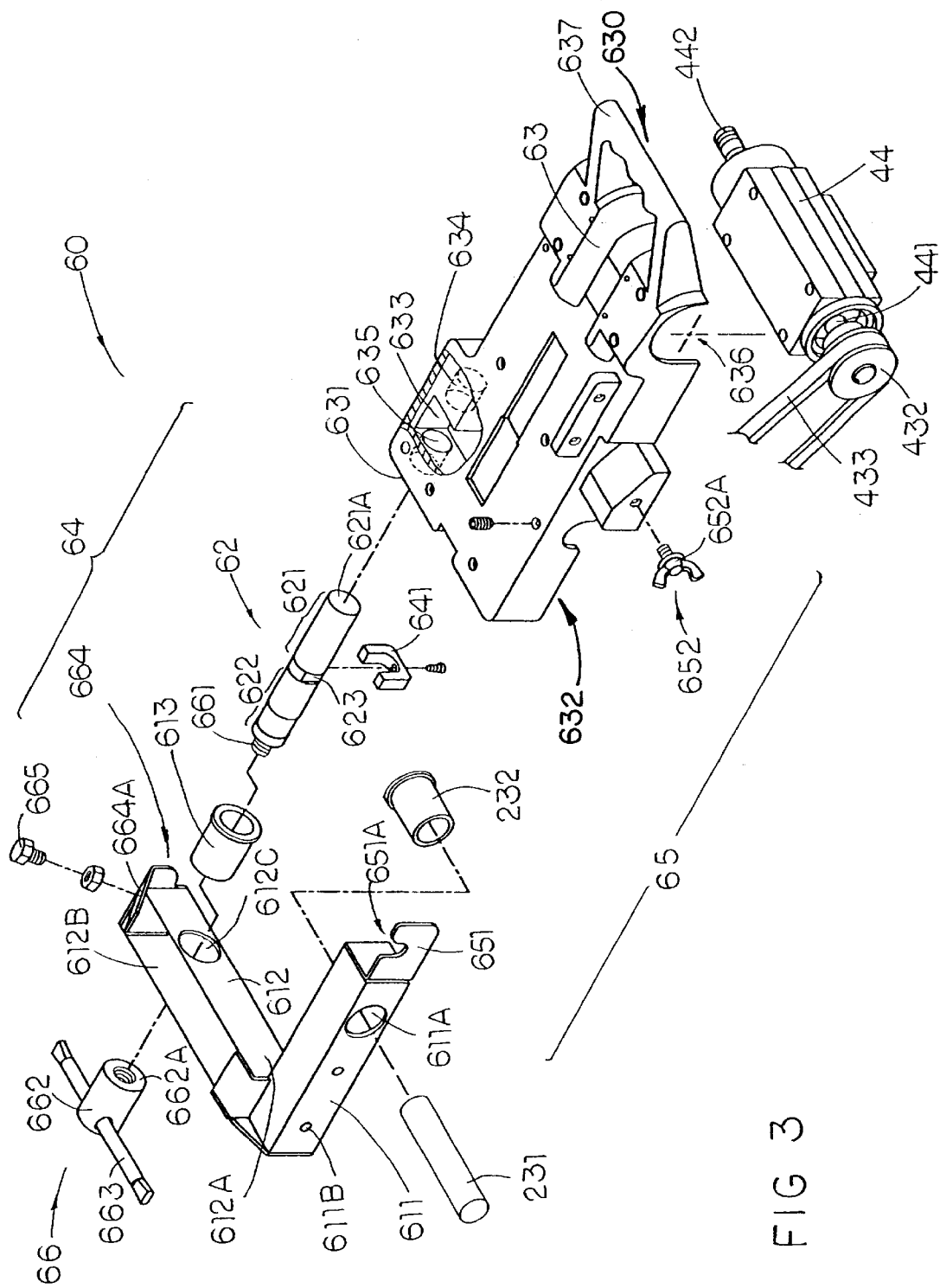
FIG. 3 is an exploded perspective view of the miter cutting arrangement according to the above preferred embodiment of the present invention.
Figure 5:
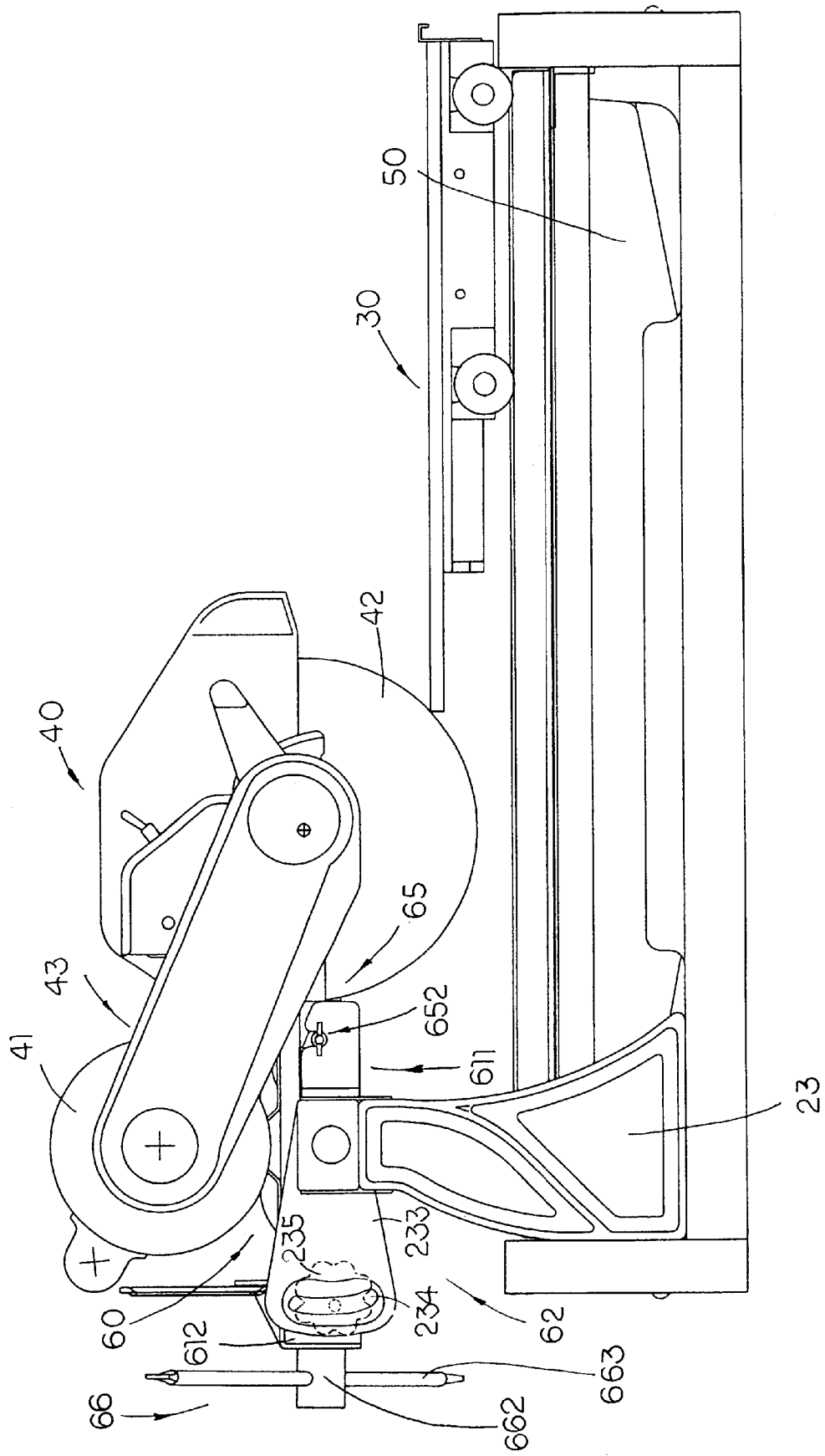
FIG. 5 is a side view of the cutting machine with built-in miter cutting feature according to the above preferred embodiment of the present invention, wherein the cutting head is at the normal position.

Referring to FIGS. 3 and 5, the miter cutting arrangement 60, which is provided between the cutting head support bracket 23 and the cutting head 40, comprises a platform support frame 61 which comprises a platform support arm 611, a mounting mean 62 (as shown in FIG. 5) for longitudinally mounting the platform support arm 611 to the cutting head support bracket 23 so as to support the platform support arm 611 longitudinally extending above of the table frame 20, and a platform pivot arm 612 having an inner end 612A affixed to the platform support arm 611 and an outer end 612B laterally extended from the platform support arm 611.

The miter cutting arrangement 60 further comprises a head platform 63 for the motor firmly mounted thereon and the saw blade 42 rotatably supported at an outer side thereof, and a pivot means 64 which is adapted for pivotally connecting the outer side 631 of the head platform 63 with the platform pivot arm 612 perpendicularly that the head platform 63 as well as the cutting head 40 mounted thereon are able to be rotated about the outer side 631 of the head platform 63 to a slanted position by lifting an inner side 632 of the head platform 63 up from the platform support frame 611.

The miter cutting arrangement 60 also comprises a supporting means 65 and a locker device 66 for selectively locking the cutting head 40 at the normal position and the slanted position. The supporting means 65 is adapted for supporting the inner side 632 of the head platform 63 with the platform support arm 611, so that, during the normal position, the outer side 631 and the inner side 632 of the head platform 63 are respectively supported by the platform pivot arm 612 and the platform support arm 611.

Figure 2:
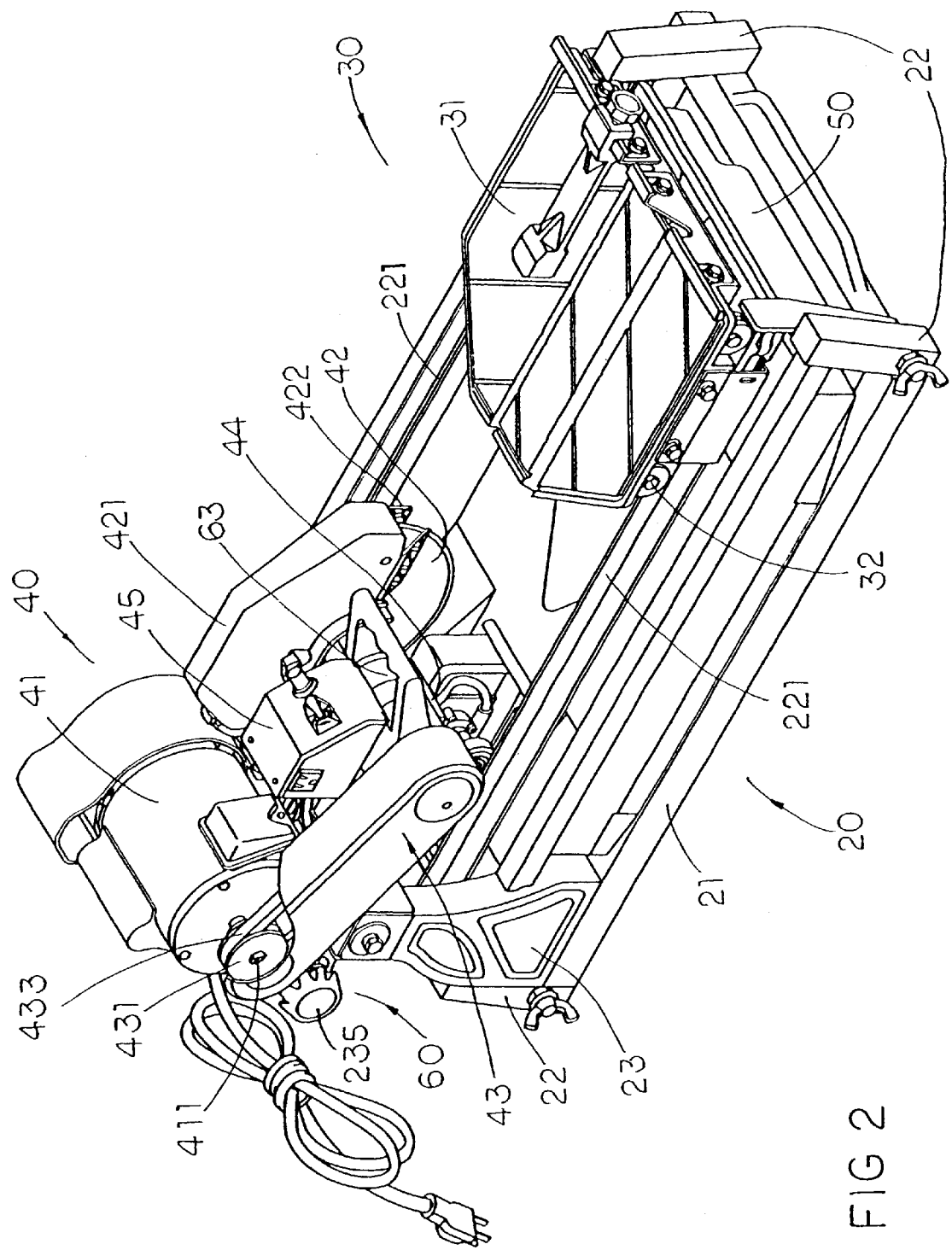
FIG. 2 is a perspective view of a cutting machine with built-in miter cutting feature according to a preferred embodiment of the present invention.

As shown in FIG. 2, the table frame 20 comprises a bottom frame 21 wherein four construction posts 22 are upwardly extended from four corners of the bottom frame 21 respectively. A pair of sliding rails 221 are extended parallelly and connected between the two pairs of construction posts 22 respectively. The cutting head support bracket 23 is upwardly extended from a side of the bottom frame 21 for supporting the cutting head 40.

The cutting table 30 which is slidably mounted on the table frame 20 comprises a work table 31 sitting across the two parallel sliding rails 221 of the table frame 20 and a sliding means 32 for enabling a work table 31 of the cutting table 30 to slide longitudinally along the two sliding rails 221.

The cutting head 40 is arranged to be supported above the cutting table 30 by means of the cutting head support bracket 23 of the table frame 20. The motor 41 of the cutting head 40 comprises a driving shaft 411 extended therefrom.

The transmission means 43 comprises a bearing assembly 44 is rigidly mounted underneath a front end 630 of the head platform 63. The bearing assembly 44 has an input end 441 and an output end 442 wherein the circular saw blade 42 is rotatably connected to the output end 442 of the bearing assembly 44. The transmission means 43 further comprises a first pulley 431 rotatably connected to the driving shaft 411, a second pulley 432 rotatably connected to the input end 441 of the bearing assembly 44 and a transmission belt 433 connected between the first pulley 431 and the second pulley 432 for transmitting a rotating power of the motor 41 to the saw blade 42 via the bearing assembly 44.

The cutting head 40 further comprises a controlling head 45 positioned between the motor 41 and the bearing assembly 44 on the head platform 63, wherein the controlling head 45 comprises an electrical controlling means such as circuit control, fuse and controlling switch are installed therein for controlling the operation of the cutting machine. As shown in FIG. 2, a blade guard 421, which is in semi-circular shape, normally covers a top portion of the saw blade 42. A blade brushes 422, which are opposedly affixed on a front side portion of blade guard 421 for cleaning the two side surfaces of the saw blade 42 and preventing the loss of liquid coolant from cooling down the saw blade 42 during operation.

The coolant tray 50 has a size equal to or slightly smaller than the bottom frame 21 and a depth slightly smaller than the distance between the bottom frame 21 and the sliding rails 221. The coolant tray 50 is placed on the bottom frame 21 and guided by the two parallel sliding rails 221 such that the coolant tray 50 is adapted for pulling out from the table frame 20 sidewardly so as to clean and replace the liquid coolant therein.

Referring to FIG. 3 of the drawing, the pivot means 64 of the miter cutting arrangement 60 comprises an pivot shaft 62 having a front shaft portion 621, a rear shaft portion 622, and a square-shaped shaft neck 623 formed between the front shaft potion 621 and the rear shaft portion 622. The shaft neck 623 and the front shaft portion 621 is rotatably positioned in a shaft cavity 633 provided at a rear end of the outer side 631 of the head platform 63 and at least a front end 621A of the front shaft portion 621 is inserted into a shaft hole 634 formed at a front end wall of the shaft cavity 633. The rear shaft portion 622 of the pivot shaft 62 is arranged to rearwardly extend and penetrate through a through hole 635 provided at a rear end wall of the shaft cavity 633 and a shaft sleeve 613 which is mounted on an arm hole 612C formed at the outer end 612B of the platform pivot arm 612 of the platform support frame 61. The pivot means 64 further comprises a U-shaped stopper 641 for locking the pivot shaft 62 in position. The stopper 641 is positioned in the shaft cavity 633 and upwardly screwed around the shaft neck 623 so as to limit the pivot shaft 62 from being pulled out from the shaft cavity 633 by blocking against the rear end wall of the shaft cavity 633.

Figure 6:
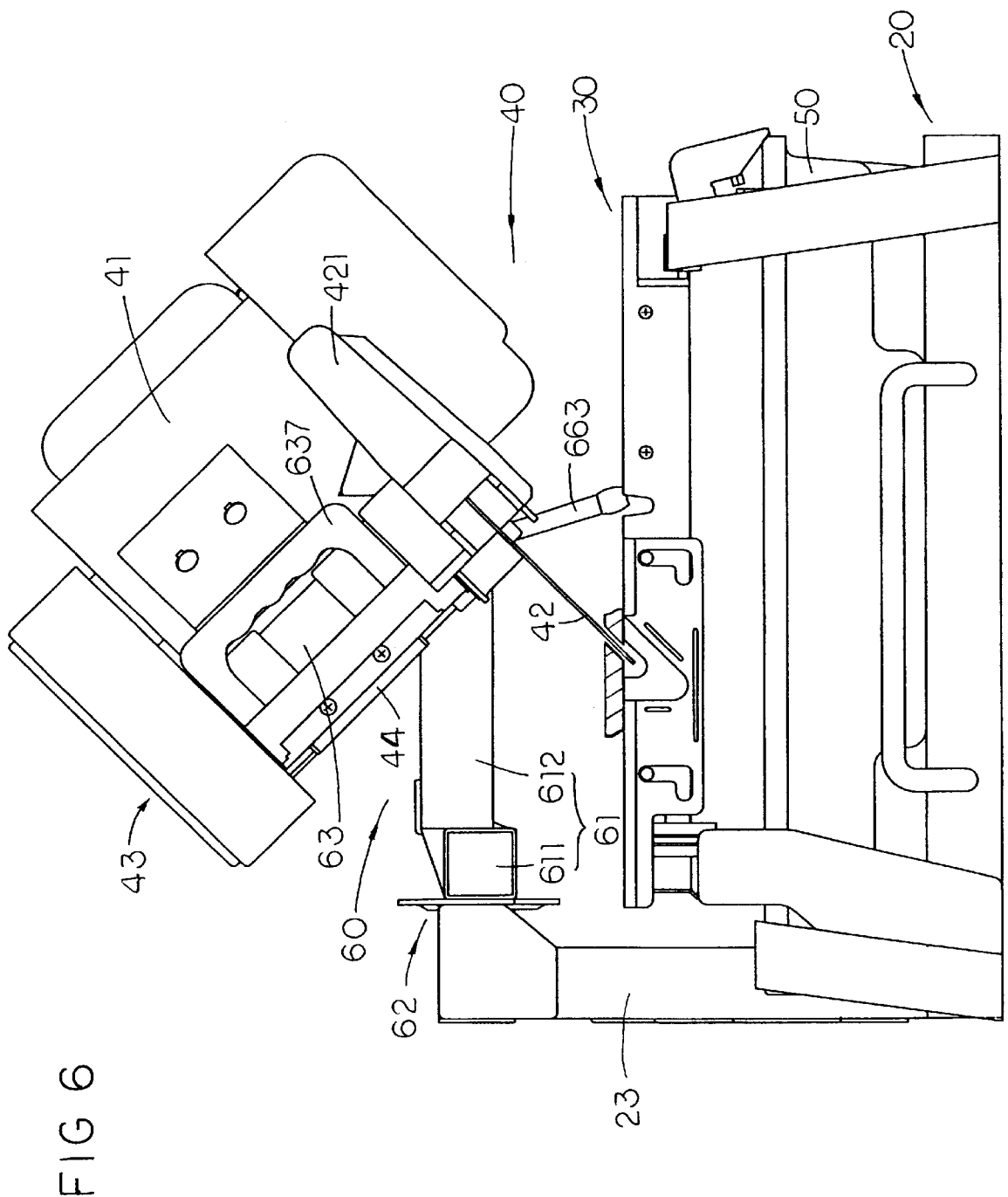
FIG. 6 is a front view of the cutting machine with built-in miter cutting feature according to the above preferred embodiment of the present invention, wherein the cutting head is rotated to the slanted position providing a bevel cut.
Figure 7:
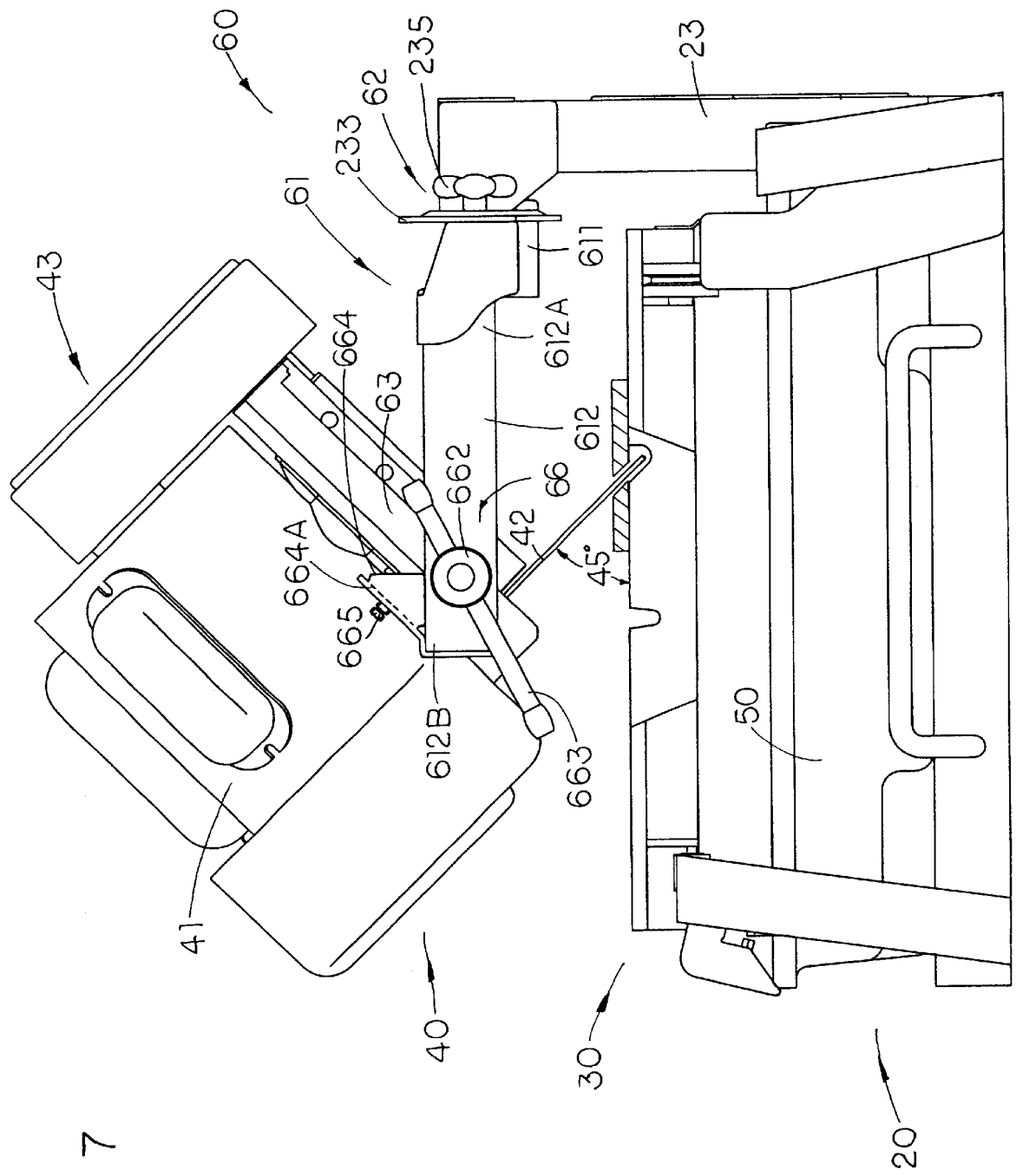
FIG. 7 is a rear view of the cutting machine with built-in miter cutting feature according to the above preferred embodiment of the present invention, wherein the cutting head is rotated to the slanted position providing a bevel cut.

As shown in FIGS. 3, 6 and 7, the pivot shaft 62 has a diameter slightly smaller than the diameter of the shaft hole 634 so that head platform 63 can be freely rotate about the pivot shaft 62. Accordingly, by means of the pivot shaft 62, the head platform 63 can be pivotally connected with the platform pivot arm 612, so that the inner side 632 of the head platform 63 can be rotated up along the pivot shaft 62, i.e. the outer side 631 of the head platform 63.

The locker device 66 comprises a threaded shank 661 integrally and coaxially connected to a rear end of the rear shaft portion 622 and rearwardly extended out of the platform pivot arm 612, and a locking head 662 which is screwed on the thread shank 661. By rotating a handle bar 663, which is radically attached to the locking head 662, to rotate the locking head 662 clockwise or anticlockwise can selectively reduce or increase the distance between a front end surface 662A of the locking head 662 and the stopper 641 mounted on the shaft neck 623 of the pivot shaft 62, so as to forcedly press the head platform 63 against the platform pivot arm 612 and lock up the inclinedly position of the head platform 63, or to release the locking pressure of the head platform 63 to enable the platform 63 being free to adjust its inclined angle by lifting up its inner side 632 about its outer side 631.

Figure 4:
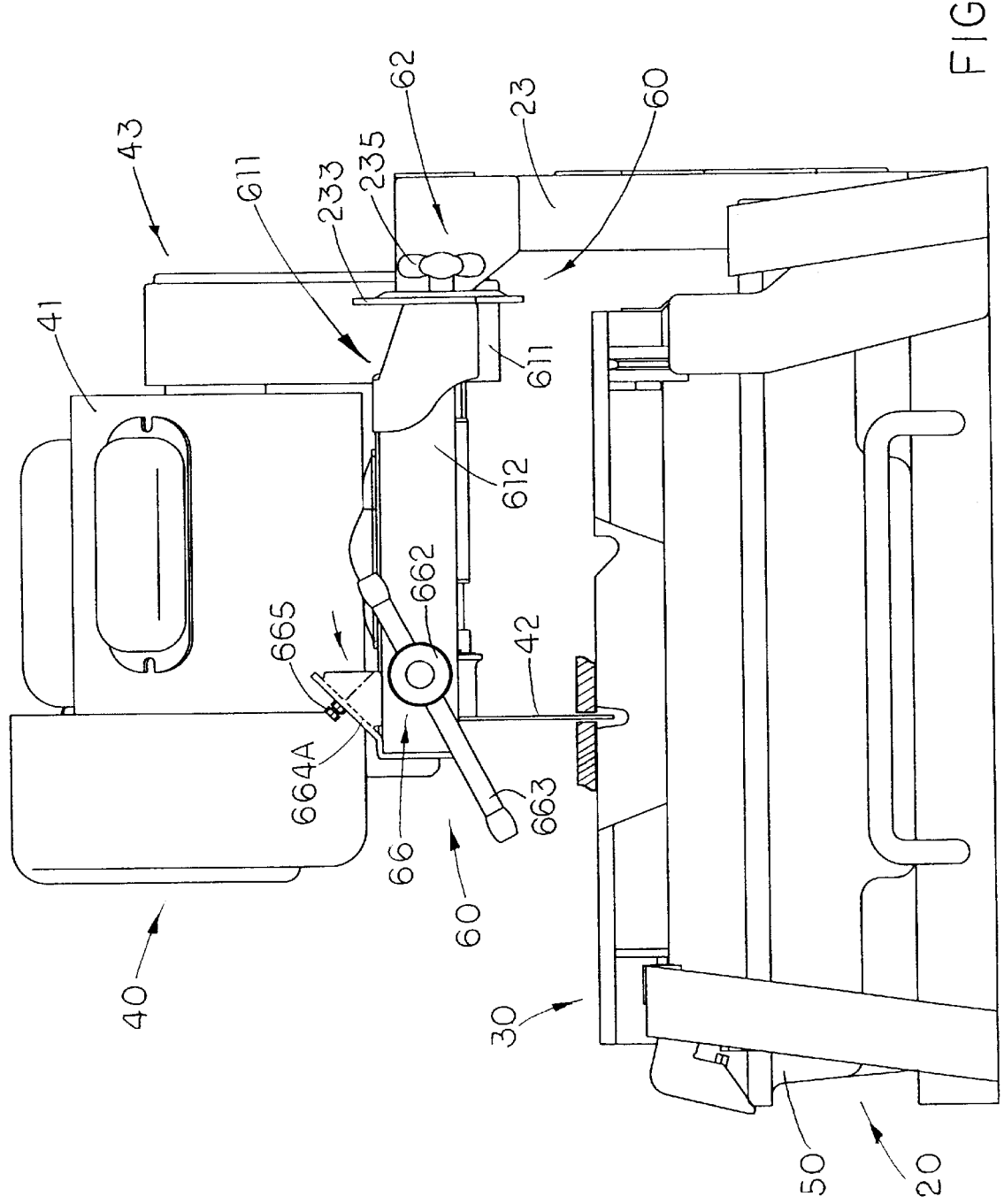
FIG. 4 is a rear view of the cutting machine with built-in miter cutting feature according to the above preferred embodiment of the present invention, wherein the cutting head is at the normal position.

As shown in FIGS. 3, 4 and 7, the locker device 66 further comprises a miter stopper 664 affixed to the outer end 612B of the platform pivot arm 612. The miter stopper 664 comprises a miter wing 664A having a 45° inclined surface opposing the head platform 63 so as to limit the maximum slanted angle of the head platform 63 at 45°. As shown in FIG. 7, when the cutting head 40 supported on the head platform 63 is lifted up inclinedly, the miter stopper 664 can stop the head platform 63 so as to limit the maximum incline angle of the saw blade 42 of the cutting head 40 to be adjusted at 45° with respect to the cutting table 30.

In order to provide further adjustment of the cutting angle of the saw blade 42 between the 45° and 90° with respect to the cutting table 30, as shown in FIGS. 3, 4 and 7, the locker device 66 further comprises an adjustment bolt 665 screwing through the miter wing 664A of the miter stopper 664, so that the head platform 63 will be stopped by the adjustment bolt 665 before in contact with the miter wing 664A. In other words, by screwing in and out of the adjustment bolt 665 with respect to the miter stopper 664 can control the inclination of the head platform 63, that is the cutting angle of the saw blade 42, being less than 45°. After the adjustment of the inclined angle of the cutting head 40, simply by tightening the locking head 662 can lock up the inclined angle of the head platform 63, the cutting head 40 and the saw blade 42.

The supporting means 65 comprises a support wing 651 longitudinally extended from a front end of the platform support arm 611, and a locking member 652 laterally protruded from the inner side 632 of the head platform 63 for coupling with the supporting wing 651. When the head platform 63 is in its normal position, that is when the head platform 63 is positioned horizontally and the saw blade 42 is positioned vertically as shown in FIG. 4, the locking member 652 is arranged to sit on the support wing 651 so that the inner side 632 of the head platform 63 is supported by the platform support arm 611.

According to this preferred embodiment of the present invention, as shown in FIGS. 3 and 5, a U-shaped engagement slot 651A is formed on the support wing 651 and the locking member 652 comprises a locking bolt 652A screwed to the inner side 632 of the head platform 63, wherein the locking bolt 652A is adapted to engage with the engagement slot 651A, so that by tightening the locking bolt 652A against support wing 651 can lock up the head platform 63 at its normal position.

The head platform 63 further provides a bearing cavity 636 underneath the front end 630 of the head platform 63 for mounting the bearing assembly 44 thereto. A handle 637 is affixed to the front end 630 of the head platform 63 such that the user is able to rotate the cutting head 40 about the pivot shaft 62 with respect to the cutting table 30.

According to the preferred embodiment of the present invention as shown in FIGS. 3 to 5, the platform support frame 61 is supported at top of the cutting head support bracket 23 by means of a support shaft 231 pivotally connected between the cutting head support bracket 23 and the platform support arm 611 of the platform support frame 61 by inserting an outer end of the support shaft 231 into a support sleeve 232 disposed in a support hole 611A on the platform support arm 611.

As shown in FIG. 5, the cutting head support bracket 23 further comprises a support strap 233 is rearwardly extended from the top end thereof, wherein an arc slot 234 is vertically provided on the support strap 233 and a screw knob 235 can be penetrated through the arc slot 234 and screwed into a threaded hole 611B provided near the rear end of the platform support arm 611 as shown in FIG. 3, so that the platform pivot arm 612 connected to the rear end of the platform support arm 611 can thus be slightly rotating up and down about the support shaft 231 so as to adjust the platform level of the head platform 63. By tightening the screw knob 235 can lock up the position of the platform pivot arm 612 with respect to the support strap 233.

To adjust the cutting head 40 to the slanted position, the user should first unlock the locking member 652 and then the locking head 662, so that the user can rotate the cutting head 40 about the pivot shaft 62 until it is blocked by the miter stopper 664 so as to adjust the inclined angle of the saw blade 42. Finally, the user should fasten the locking head 662 to lock up the slanted position of the cutting head 40. In view of above, the cutting machine with built-in miter cutting feature of the present invention can be adjustably rotated up to 45° with respect to the horizontal work piece surface for providing a bevel cut on the work piece.

What is claimed is:

1. A cutting machine with built-in miter cutting feature, comprising:
   a table frame;
   a cutting table slidably mounted on said table frame;
   a coolant tray which is supported in said table frame and is disposed beneath said cutting table; and
   a cutting head support bracket affixed at one side of said table frame for supporting said cutting head above said cutting table;
   a cutting head comprising a motor, a saw blade, and a transmission means for transmitting rotating power of said motor to drive said saw blade to rotate;
   a miter cutting arrangement, which is provided between said cutting head support bracket and said cutting head, comprising:
      a platform support frame which comprises a platform support arm, a mounting mean for longitudinally mounting said platform support arm to said cutting head support bracket so as to support said platform support arm longitudinally extending above of said table frame, and a platform pivot arm having an inner end affixed to said platform support arm and an outer end laterally extended from said platform support arm;
      a head platform wherein said motor is firmly mounted thereon and said saw blade is rotatably supported at an outer side thereof;
      a pivot means for pivotally connecting said outer side of said head platform with said platform pivot arm in a perpendicular manner that said cutting head is able to be rotated about said platform pivot arm to a slanted position by lifting an inner side of said head platform up from said platform support frame;

a supporting means for supporting said inner side of said head platform with said platform support arm, so that, during a normal position, said outer side and said inner side of said head platform are respectively supported by said platform pivot arm and said platform support arm; and a locker device for selectively locking said cutting head at said normal position and said slanted position.

2. The cutting machine, as recited in claim 1, wherein said supporting means comprises a support wing longitudinally extended from a front end of said platform support arm, and a locking member laterally protruded from said inner side of said head platform for coupling with said supporting wing in order to support said inner side of said head platform by said platform support arm.

3. The cutting machine, as recited in claim 1, wherein said locker device comprises a miter stopper affixed to said outer end of said platform pivot arm, said miter stopper having a 45° inclined surface opposing said head platform so as to limit a maximum slanted angle of said head platform at 45°, thereby when said cutting head supported on said head platform is lifted up inclinedly, said miter stopper stops said head platform so as to limit a maximum inclined angle of said saw blade of said cutting head to be adjusted at 45° with respect to said cutting table.

4. The cutting machine, as recited in claim 3, wherein said locker device further comprises an adjustment bolt screwing through said miter stopper, so that said head platform is able to be stopped by said adjustment bolt before in contact with said 45° inclined surface of said miter stopper.

5. The cutting machine, as recited in claim 3, wherein said supporting means comprises a support wing longitudinally extended from a front end of said platform support arm, and a locking member laterally protruded from said inner side of said head platform for coupling with said supporting wing in order to support said inner side of said head platform by said platform support arm.

6. The cutting machine, as recited in claim 1, wherein said pivot means of said miter cutting arrangement comprises a pivot shaft having a front shaft portion and a rear shaft portion positioned in a shaft cavity provided at a rear end of said outer side of said head platform and at least a front end of said front shaft portion is inserted into a shaft hole formed at a front end wall of said shaft cavity, so as to pivotally connect said head platform with said platform pivot arm by means of said pivot shaft so that said head platform is able to be rotated about said pivot shaft.

7. The cutting machine, as recited in claim 6, wherein said locker device comprises a threaded shank integrally and coaxially connected to a rear end of said rear shaft portion and rearwardly extended out of said platform pivot arm, and a locking head which is screwed on said thread shank, wherein by rotating said locking head to forcedly press said head platform against said platform pivot arm, said inclinedly position of said head platform is locked up.

8. The cutting machine, as recited in claim 6, wherein said supporting means comprises a support wing longitudinally extended from a front end of said platform support arm, and a locking member laterally protruded from said inner side of said head platform for coupling with said supporting wing in order to support said inner side of said head platform by said platform support arm.

9. The cutting machine, as recited in claim 8, wherein a U-shaped engagement slot is formed on said support wing and said locking member comprises a locking bolt which is screwed to said inner side of said head platform and adapted to engage with said engagement slot, so that said head platform position is locked up horizontally with respect to said cutting table by tightening said locking bolt against said support wing.

10. The cutting machine, as recited in claim 6, wherein said locker device comprises a miter stopper affixed to said outer end of said platform pivot arm, said miter stopper having a 45° inclined surface opposing said head platform so as to limit a maximum slanted angle of said head platform at 45°, thereby when said cutting head supported on said head platform is lifted up inclinedly, said miter stopper stops said head platform so as to limit a maximum inclined angle of said saw blade of said cutting head to be adjusted at 45° with respect to said cutting table.

11. The cutting machine, as recited in claim 10, wherein said locker device further comprises an adjustment bolt screwing through said miter stopper, so that said head platform is able to be stopped by said adjustment bolt before in contact with said 45° inclined surface of said miter stopper.

12. The cutting machine, as recited in claim 10, wherein said supporting means comprises a support wing longitudinally extended from a front end of said platform support arm, and a locking member laterally protruded from said inner side of said head platform for coupling with said supporting wing in order to support said inner side of said head platform by said platform support arm.

13. The cutting machine, as recited in claim 12, wherein a U-shaped engagement slot is formed on said support wing and said locking member comprises a locking bolt which is screwed to said inner side of said head platform and adapted to engage with said engagement slot, so that said head platform position is locked up horizontally with respect to said cutting table by tightening said locking bolt against said support wing.

14. The cutting machine, as recited in claim 6, wherein said rear shaft portion of said pivot shaft is arranged to rearwardly extend and penetrate through a through hole provided at a rear end wall of said shaft cavity and a shaft sleeve which is mounted on an arm hole formed at said outer end of said platform pivot arm of said platform support frame.

15. The cutting machine, as recited in claim 14, wherein said locker device comprises a threaded shank integrally and coaxially connected to a rear end of said rear shaft portion and rearwardly extended out of said platform pivot arm, and a locking head which is screwed on said thread shank, wherein by rotating said locking head to forcedly press said head platform against said platform pivot arm, said inclinedly position of said head platform is locked up.

16. The cutting machine, as recited in claim 15, wherein said locker device comprises a miter stopper affixed to said outer end of said platform pivot arm, said miter stopper having a 45° inclined surface opposing said head platform so as to limit a maximum slanted angle of said head platform at 45°, thereby when said cutting head supported on said head platform is lifted up inclinedly, said miter stopper stops said head platform so as to limit a maximum inclined angle of said saw blade of said cutting head to be adjusted at 45° with respect to said cutting table.

17. The cutting machine, as recited in claim 16, wherein said locker device further comprises an adjustment bolt screwing through said miter stopper, so that said head platform is able to be stopped by said adjustment bolt before in contact with said 45° inclined surface of said miter stopper.

18. The cutting machine, as recited in claim 16, wherein said supporting means comprises a support wing longitudinally extended from a front end of said platform support arm, and a locking member laterally protruded from said inner side of said head platform for coupling with said supporting wing in order to support said inner side of said head platform by said platform support arm.

19. The cutting machine, as recited in claim 18, wherein a U-shaped engagement slot is formed on said support wing and said locking member comprises a locking bolt which is screwed to said inner side of said head platform and adapted to engage with said engagement slot, so that said head platform position is locked up horizontally with respect to said cutting table by tightening said locking bolt against said support wing.

20. The cutting machine, as recited in claim 6, wherein said pivot means further comprises a stopper for locking said pivot shaft in position, said pivot shaft further having a shaft neck formed between said front shaft potion, said stopper being positioned in said shaft cavity and affixed around said shaft neck so as to limit said pivot shaft from being pulled out from said shaft cavity by blocking against a rear end wall of said shaft cavity.

21. The cutting machine, as recited in claim 20, wherein said locker device comprises a threaded shank integrally and coaxially connected to a rear end of said rear shaft portion and rearwardly extended out of said platform pivot arm, and a locking head which is screwed on said thread shank, wherein by rotating said locking head to reduce a distance between a front end surface of said locking head and said stopper mounted on said shaft neck of said pivot shaft, said head platform is forcedly pressed against said platform pivot arm to lock up said head platform at an inclined angle with respect to said cutting table.

22. The cutting machine, as recited in claim 20, wherein said rear shaft portion of said pivot shaft is arranged to rearwardly extend and penetrate through a through hole provided at said rear end wall of said shaft cavity and a shaft sleeve which is mounted on an arm hole formed at said outer end of said platform pivot arm of said platform support frame.

23. The cutting machine, as recited in claim 22, wherein said locker device comprises a threaded shank integrally and coaxially connected to a rear end of said rear shaft portion and rearwardly extended out of said platform pivot arm, and a locking head which is screwed on said thread shank, wherein by rotating said locking head to reduce a distance between a front end surface of said locking head and said stopper mounted on said shaft neck of said pivot shaft, said head platform is forcedly pressed against said platform pivot arm to lock up said head platform at an inclined angle with respect to said cutting table.

24. The cutting machine, as recited in claim 23, wherein said supporting means comprises a support wing longitudinally extended from a front end of said platform support arm, and a locking member laterally protruded from said inner side of said head platform for coupling with said supporting wing in order to support said inner side of said head platform by said platform support arm.

25. The cutting machine, as recited in claim 23, wherein said locker device comprises a miter stopper affixed to said outer end of said platform pivot arm, said miter stopper having a 45° inclined surface opposing said head platform so as to limit a maximum slanted angle of said head platform at 45°, thereby when said cutting head supported on said head platform is lifted up inclinedly, said miter stopper stops said head platform so as to limit a maximum inclined angle of said saw blade of said cutting head to be adjusted at 45° with respect to said cutting table.

26. The cutting machine, as recited in claim 25, wherein said supporting means comprises a support wing longitudinally extended from a front end of said platform support arm, and a locking member laterally protruded from said inner side of said head platform for coupling with said supporting wing in order to support said inner side of said head platform by said platform support arm.

27. The cutting machine, as recited in claim 26, wherein a U-shaped engagement slot is formed on said support wing and said locking member comprises a locking bolt which is screwed to said inner side of said head platform and adapted to engage with said engagement slot, so that said head platform position is locked up horizontally with respect to said cutting table by tightening said locking bolt against said support wing.

28. The cutting machine, as recited in claim 25, wherein said locker device further comprises an adjustment bolt screwing through said miter stopper, so that said head platform is able to be stopped by said adjustment bolt before in contact with said 45° inclined surface of said miter stopper.

29. The cutting machine, as recited in claim 28, wherein said supporting means comprises a support wing longitudinally extended from a front end of said platform support arm, and a locking member laterally protruded from said inner side of said head platform for coupling with said supporting wing in order to support said inner side of said head platform by said platform support arm.

30. The cutting machine, as recited in claim 29, wherein a U-shaped engagement slot is formed on said support wing and said locking member comprises a locking bolt which is screwed to said inner side of said head platform and adapted to engage with said engagement slot, so that said head platform position is locked up horizontally with respect to said cutting table by tightening said locking bolt against said support wing.

\* \* \* \* \*